United States Patent
Inaba (10) Patent No.: US 6,803,079 B2
(45) Date of Patent: Oct. 12, 2004

(54) METHOD FOR MANUFACTURING REFLECTOR

(75) Inventor: Teruaki Inaba, Shizuoka-ken (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 66 days.

(21) Appl. No.: 10/326,737

(22) Filed: Dec. 20, 2002

(65) Prior Publication Data

US 2003/0132537 A1 Jul. 17, 2003

(30) Foreign Application Priority Data

Jan. 10, 2002 (JP) ........................................ 2002-003501

(51) Int. Cl.$^7$ ................................................. H05H 1/00
(52) U.S. Cl. ....................... 427/536; 264/129; 427/162; 427/250; 427/404; 427/407.1; 427/569; 427/578
(58) Field of Search ................................. 427/536, 162, 427/248.1, 250, 404, 407.1, 569, 578; 264/129

(56) References Cited

U.S. PATENT DOCUMENTS

4,085,248 A 4/1978 Zehender et al.

*Primary Examiner*—Bernard Pianalto
(74) *Attorney, Agent, or Firm*—Osha & May L.L.P.

(57) ABSTRACT

A method and apparatus for forming a hydrophilic layer on a surface of polymer layer of a reflector economically and safely. The method for manufacturing a reflector includes steps of molding a base body of the reflector; forming reflective layer for reflecting light on a surface of the base body; forming a layer of water-repellent polymer on a surface of the reflective layer; and performing hydrophilic treatment on a surface of the polymer layer using plasma of gaseous argon.

5 Claims, 10 Drawing Sheets

METHOD FOR MANUFACTURING REFLECTOR

This patent application claims priority from a Japanese patent application No. 2002-003501 filed on Jan. 10, 2002, the contents of which are incorporated herein by reference.

BACKGROUND OF THE INVENTION

1. Field of the Invention

The present invention relates to a reflector and a method and an apparatus for manufacturing a reflector. More particularly, the present invention relates to a method of forming a hydrophilic layer on a surface of an ineffective area of the reflector economically and safely.

2. Description of Related Art

Figure 1A:
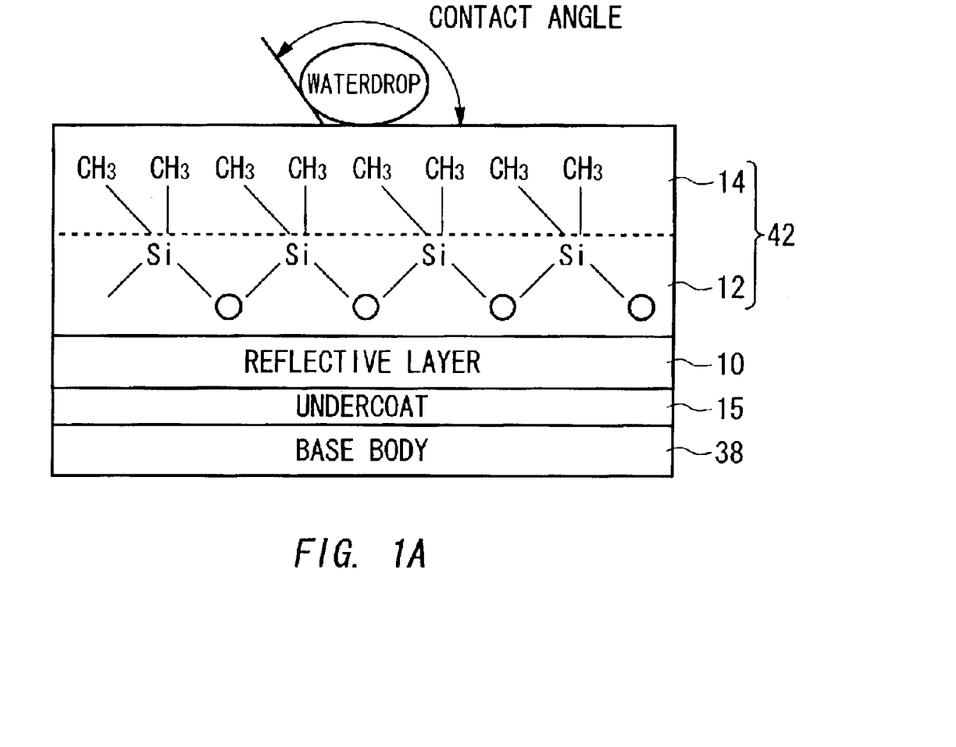
Figure 1B:
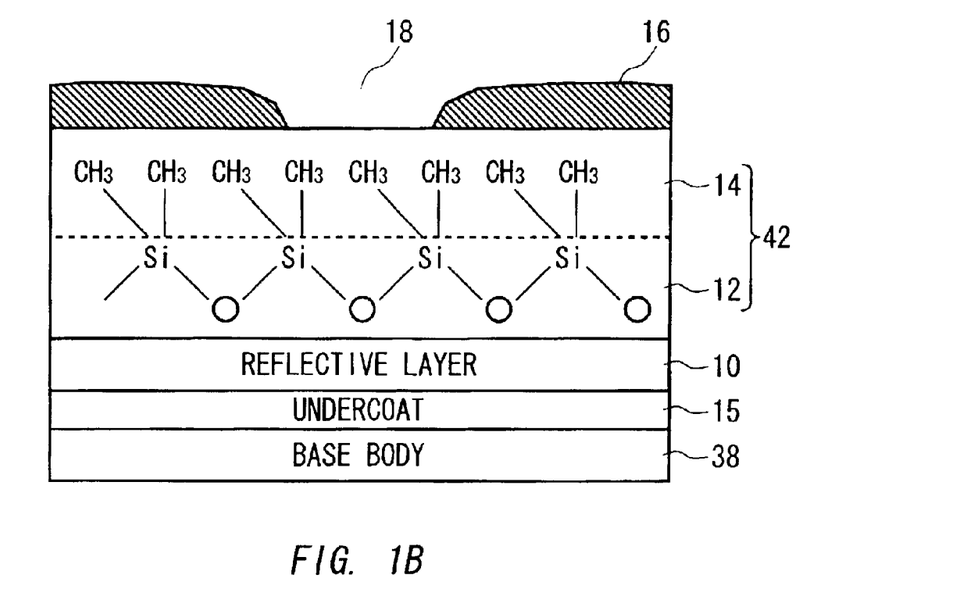

FIGS. 1A and 1B are cross-sectional views of a conventional reflector used for a headlamp of a motor vehicle and the like. The reflector includes a base body 38, undercoat 15, reflective layer 10, and water-repellent polymer layer 42. The base body 38 is formed into a shape of the reflector out of material such as synthetic resin or metallic material. The undercoat 15 is formed on a surface of the base body 38. The undercoat 15 is a layer for adhering the reflective layer 10 to the base body 38. The reflective layer 10 is formed of material for reflecting light, such as aluminum, and is evaporated on a surface of the undercoat 15. In order to protect the reflective layer 10, the polymer layer 42, which is a layer of a polymer, is formed on a surface of the reflective layer 10. As shown in FIGS. 1A and 1B, in a case where the polymer layer 42 is formed of polymer with hexamethyldisiloxane (HMDSO), a layer 12 formed of silicon dioxide ($SiO_2$) and a layer 14 formed of methyl group (CH3) are formed.

Since the polymer layer 42 includes the layer 14 of methyl group on the surface, the surface of the polymer layer 42 has high water repellence. Therefore, as shown in FIG. 1A, contact angle between a water drop and the polymer layer 42 is large. Therefore, when moisture condenses on the polymer layer 42, shape of the water drop on the polymer layer 42 becomes spherical and the water drop appears to be a foreign matter adhering on the surface of the reflector. Furthermore, when a colored layer is to be formed on the surface of the polymer layer 42 by painting, there occurs a portion 18 on which paint 16 does not adhere. This phenomenon is called crawling and the crawling deteriorates the appearance of the reflector. Therefore, it is preferable that the surface of the polymer layer 42 is moderately hydrophilic.

Figure 2:
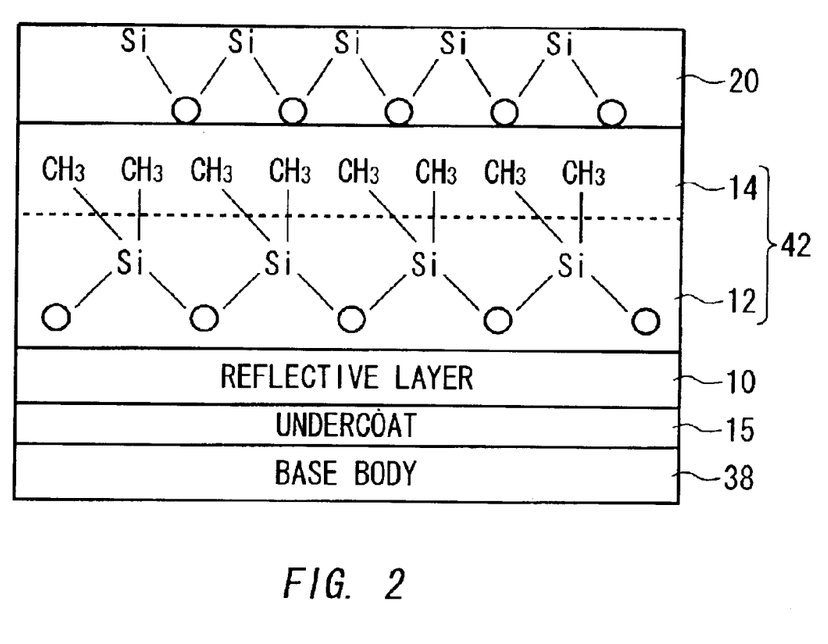
FIG. 2 is a cross-sectional view of a conventional reflector on which a hydrophilic layer is formed.

FIG. 2 is a cross-sectional view of a conventional reflector where a hydrophilic layer is formed on the surface of the polymer layer 42. A conventional method for manufacturing a reflector forms a hydrophilic layer 20, such as silicon dioxide (SiO2), on the surface of the polymer layer 42, in order to make the surface of the polymer layer 42 to be hydrophilic, as shown in FIG. 2. However, since this hydrophilic layer 20 is formed in addition to the polymer layer 42, expensive hydrophilic material is required and the manufacturing cost becomes high.

Moreover, since apparatus for forming the hydrophilic layer 20 is required in addition to apparatus for forming the polymer layer 42, a configuration of the entire apparatus for manufacturing the reflector becomes complicated. Furthermore, since the silicon dioxide used as material of the hydrophilic layer is supplied in the form of tablets or powder, apparatus for supplying the material becomes complicated and consequently the configuration of the entire apparatus for manufacturing the reflector becomes complicated. Therefore, costs for manufacturing the reflector are very high.

SUMMARY OF THE INVENTION

Therefore, it is an object of the present invention to provide a reflector and a method and an apparatus for manufacturing a reflector which can solve the foregoing problem. The above and other objects can be achieved by combinations described in the independent claims. The dependent claims define further advantageous and exemplary combinations of the present invention.

According to the first aspect of the present invention, there is provided a method for manufacturing a reflector. The method includes steps of molding a base body of the reflector; forming reflective layer for reflecting light on a surface of the base body; forming layer of water-repellent polymer on a surface of the reflective layer; and performing hydrophilic treatment on a surface of the polymer layer using plasma of gaseous argon.

It is preferable that the reflective layer formation step includes a step of evaporating the reflective layer on a surface of the base body using the gaseous argon supplied from the same source as that of the gaseous argon used in the hydrophilic treatment step. Moreover, it is preferable that the reflective layer formation step evaporates the layer of aluminum on a surface of the base body. The polymer layer formation step may form the polymer layer by polymerizing hexamethyldisiloxane. The method for manufacturing a reflector may further include a step of forming a colored layer on a surface of the polymer layer, on which the surface is subjected to the hydrophilic treatment. It is preferable that the hydrophilic treatment step substitutes hydrophilic group for hydrophobic group on a surface of the polymer layer by plasma of the gaseous argon contacting a surface of the polymer layer. Furthermore, it is preferable that the hydrophilic treatment step controls the quantity of hydrophilic group which is substituted for hydrophobic group based on duration of the hydrophilic treatment.

According to the second aspect of the present invention, there is provided an apparatus for manufacturing a reflector. The apparatus includes a base body molding unit for molding a base body of the reflector; a first source for supplying gaseous argon; an evaporating unit for evaporating reflective layer for reflecting light on a surface of the base body by using the gaseous argon supplied from the first source; an RF generator for generating high-frequency current; a plasma generator, which connects with the RF generator and the first source, for generating plasma from the gaseous argon supplied from the first source using the high-frequency current; and a plasma reactor, which connects with the plasma generator, and includes a chamber for accommodating the base body.

It is preferable that the apparatus for manufacturing a reflector further includes a second source for supplying gas of a water-repellent monomer, and the plasma reactor generates plasma from the water-repellent monomer supplied from the second source using the plasma generator, and forms a layer of the water-repellent polymer on a surface of the reflective layer evaporated on a surface of the base body accommodated in the chamber. It is also preferable that the plasma reactor performs hydrophilic treatment on a surface of the polymer layer by generating plasma in the chamber from the gaseous argon supplied from the first source using the plasma generator, and by allowing plasma of the gaseous argon to contact with a surface of the polymer layer.

The summary of the invention does not necessarily describe all necessary features of the present invention. The present invention may also be a sub-combination of the features described above.

BRIEF DESCRIPTION OF THE DRAWINGS

FIGS. 1A and 1B are cross-sectional views of a conventional reflector used for a headlamp of a motor vehicle and the like.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 3:
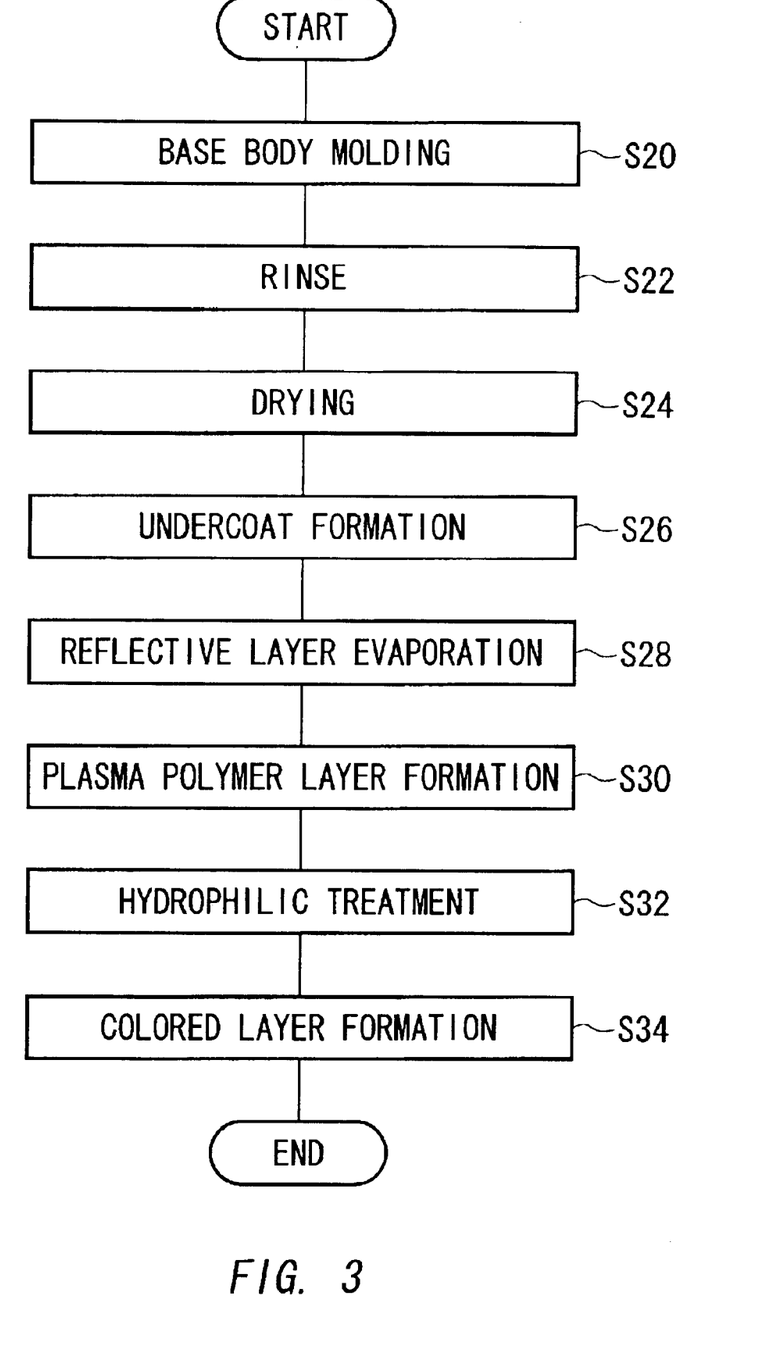
FIG. 3 is a flowchart of a method for manufacturing a reflector according to an embodiment of the present invention.

FIG. 3 is a flowchart of a method for manufacturing a reflector according to an embodiment of the present invention. First, a base body of the reflector is molded (S20). Specifically, raw material, such as synthetic resin or a metallic material, is molded into a shape of the reflector by injection molding or the like. Next, the base body is rinsed with water (S22) and is dried (S24). Next, undercoat is formed on the surface of the rinsed base body (S26). The undercoat maybe formed by painting onto the base body.

Next, reflective layer for reflecting light is formed on the surface of the base body on which the undercoat is formed (S28). Specifically, layer formed of material reflecting light, such as aluminum, is evaporated on the surface of the base body. Gaseous argon is used for the formation of the reflective layer, where the gaseous argon is supplied from the same source as that of gaseous argon used in a hydrophilic treatment step (S32) described below.

Next, water-repellent polymer layer is formed on the surface of the reflective layer (S30). The polymer layer functions as alkali-proof overcoat for preventing oxidization and corrosion of the reflective layer which is formed of aluminum or the like. The polymer layer may be formed by polymerizing plasma of monomer including silicon, such as hexamethyldisiloxane (HMDSO).

Next, a part of the surface of the polymer layer is treated to be hydrophilic using the plasma of the gaseous argon (S32). The reflector for reflecting light from a light source includes an effective area which functions as a reflector for focusing a desired light distribution pattern, and an ineffective area which is a portion other than the effective area of the reflector and does not contribute to the focusing of the light distribution pattern directly. Although the entire reflective area of the reflector is treated to be hydrophilic, excessive hydrophilic treatment may deteriorate the function of the polymer layer as an overcoat and the reflective layer may be oxidized or corroded. Therefore, degree of the hydrophilic treatment on the polymer layer needs to be controlled moderately.

Moreover, especially in the ineffective area of the reflector, colored layer, which is colored for a purpose of improving appearance of the entire part of the reflector, may be formed on the surface of the polymer layer. In this case, it is difficult to form a high quality colored layer on the surface of the polymer layer when the surface of the polymer layer is water repellent. Therefore, in order to form a high quality colored layer on the surface of the polymer layer, the surface of the polymer layer needs to be treated to be hydrophilic.

A hydrophilic treatment is subjected to the hydrophilic treatment step (S32) using the gaseous argon supplied from the same source as the source of the gaseous argon used in the reflective layer formation step (S28). When plasma of the gaseous argon contacts the surface of the polymer layer, a hydrophilic group is substituted for a hydrophobic group on the surface of the polymer layer. Finally, the colored layer is formed on the hydrophilic surface of the polymer layer (S34). For example, the colored layer is formed by painting.

Figure 4:
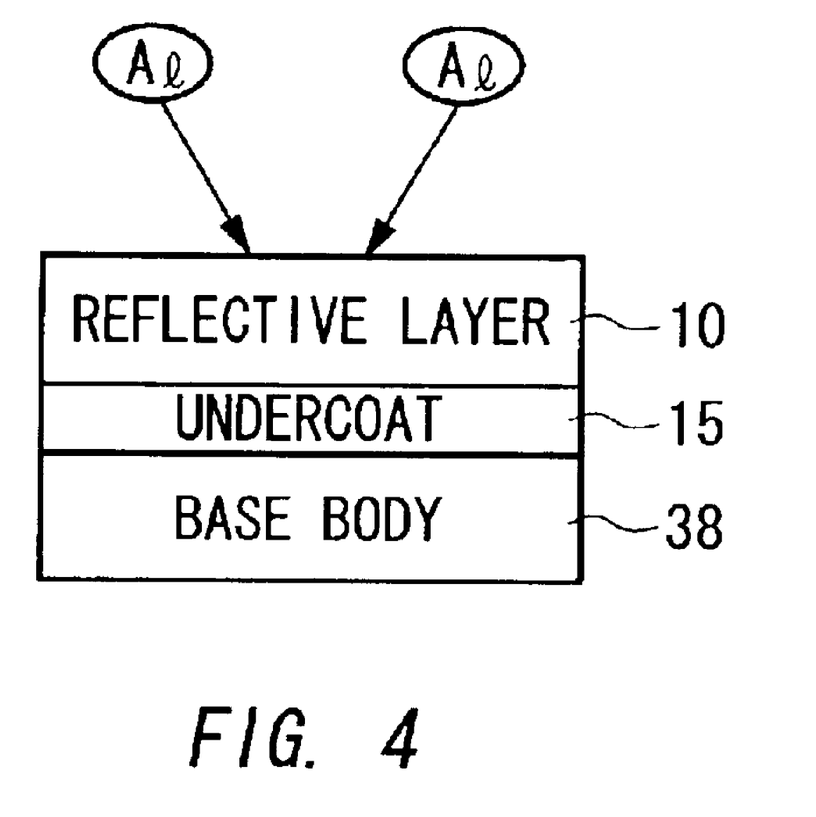
FIG. 4 is a schematic cross-sectional view of the reflector showing a state of evaporating reflective layer in a reflective layer evaporating step shown in FIG. 4.

FIG. 4 is a schematic cross-sectional view of the reflector showing a state of evaporating the reflective layer in the reflective layer evaporating step (S28) shown in FIG. 3. In the undercoat formation step (S26), the undercoat 15 is formed on the surface of the base body 38, which is molded in the base body molding step (S20). Furthermore, the reflective layer 10 is evaporated on the surface of the undercoat 15. By heating metallic material, such as aluminum, in vacuum condition, the metallic material evaporates and condenses on the surface of the undercoat 15, so that the reflective layer 10 is formed.

Figure 5:
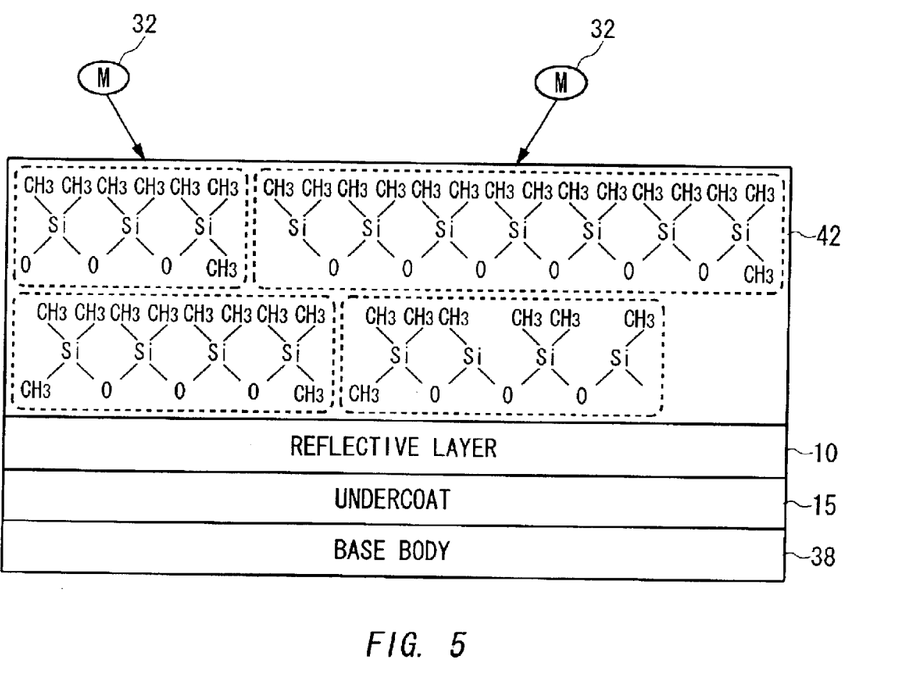
FIG. 5 is a schematic cross-sectional view of the reflector showing a state of formation of polymer layer in a plasma polymer layer formation step shown in FIG. 4.

FIG. 5 is a schematic cross-sectional view of the reflector showing a state of formation of the polymer layer in a plasma polymer layer formation step (S30) shown in FIG. 3. The polymer layer 42 is formed on the surface of the reflective layer 10 formed in the reflective layer evaporating step (S28). The polymer layer 42 shown in FIG. 5 is formed of the polymer with hexamethyldisiloxane (HMDSO). The polymer layer 42 is formed by the plasma 32 of monomer gas of the HMDSO being polymerized and adsorbed on the surface of the reflective layer 15. The polymer layer 42 includes a layer formed of silicon dioxide ($SiO_2$), and a layer formed of methyl group ($CH_3$). Since the polymer layer 42 includes the layer of methyl group on the surface, the surface of the polymer layer 42 is water repellent. Instead of the HMDSO, another material may be used for material of the polymer layer 42. The thickness of the polymer layer 42 formed on the surface of the reflective layer is about 500–6000 angstrom.

Figure 6A:
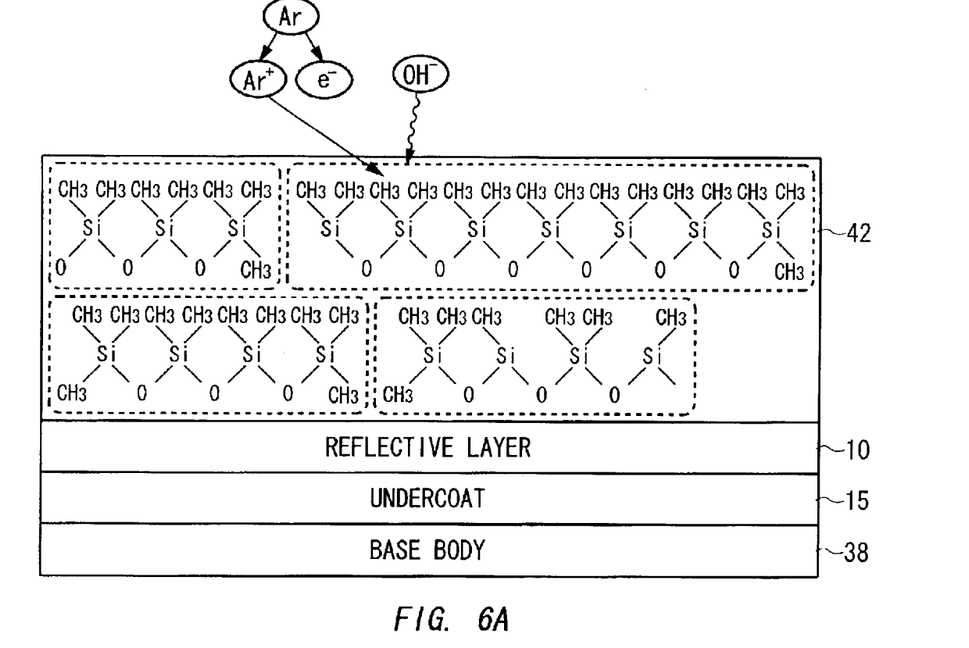
FIGS. 6A and 6B are schematic cross-sectional views of the reflector showing substitution reaction performed on the surface of the polymer layer in a hydrophilic treatment step shown in FIG. 4.
Figure 6B:
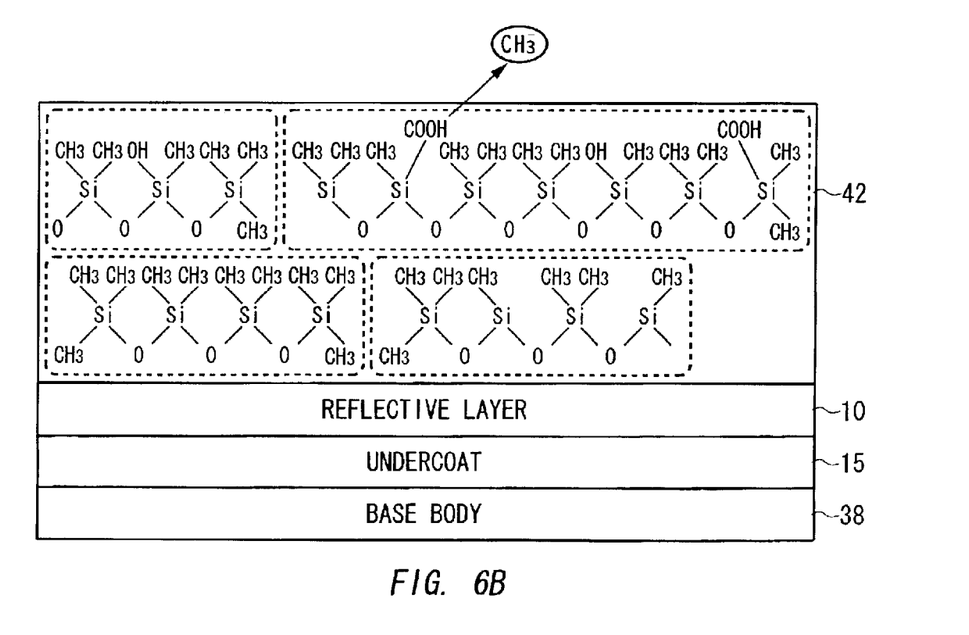

FIGS. 6A and 6B are schematic cross-sectional views of the reflector showing substitution reaction performed on the surface of the ineffective area of the polymer layer in the hydrophilic treatment step (S32) shown in FIG. 3. Since the surface of the polymer layer 42, formed in the plasma polymer layer formation step (S30), is water repellent, it is required to be subjected to a hydrophilic treatment on the layer of the methyl group which exists on the surface of the ineffective area of the polymer layer so as to facilitate the formation of the colored layer on the surface of the polymer layer in the ineffective area.

As shown in FIG. 6A, argon plasma ($Ar^+$) of gaseous argon (Ar) contacts hydrophobic group, such as methyl group ($CH3$), on the surface of the polymer layer 42, and separates the hydrophobic group from bond with silicon dioxide. Hydrophilic group, such as hydroxy group (—OH) and carboxy group (—COOH) which exists in the atmosphere, bonds with the silicon dioxide separated from the hydrophobic group. The hydrophilic group is substituted for the hydrophobic group by this reaction. The quantity of the hydrophilic group substituted for the hydrophobic group is controllable by the hydrophilic treatment step (S32) based on duration of the hydrophilic treatment. Therefore, the degree of the hydrophilic treatment on the surface of the polymer layer 42 is controllable based on the duration of the hydrophilic treatment. As explained above, since the excessive hydrophilic treatment deteriorates the function of the polymer layer 42 as an overcoat in the ineffective area and the reflective layer may be oxidized and corroded, it is important to adjust the degree of the hydrophilic treatment on the polymer layer 42 moderately. It is preferable to control the degree of the hydrophilic treatment so that a contact angle between the polymer layer 42, on which the surface is subjected to the hydrophilic treatment, and a water drop becomes about 50 degrees or less.

Figure 7:
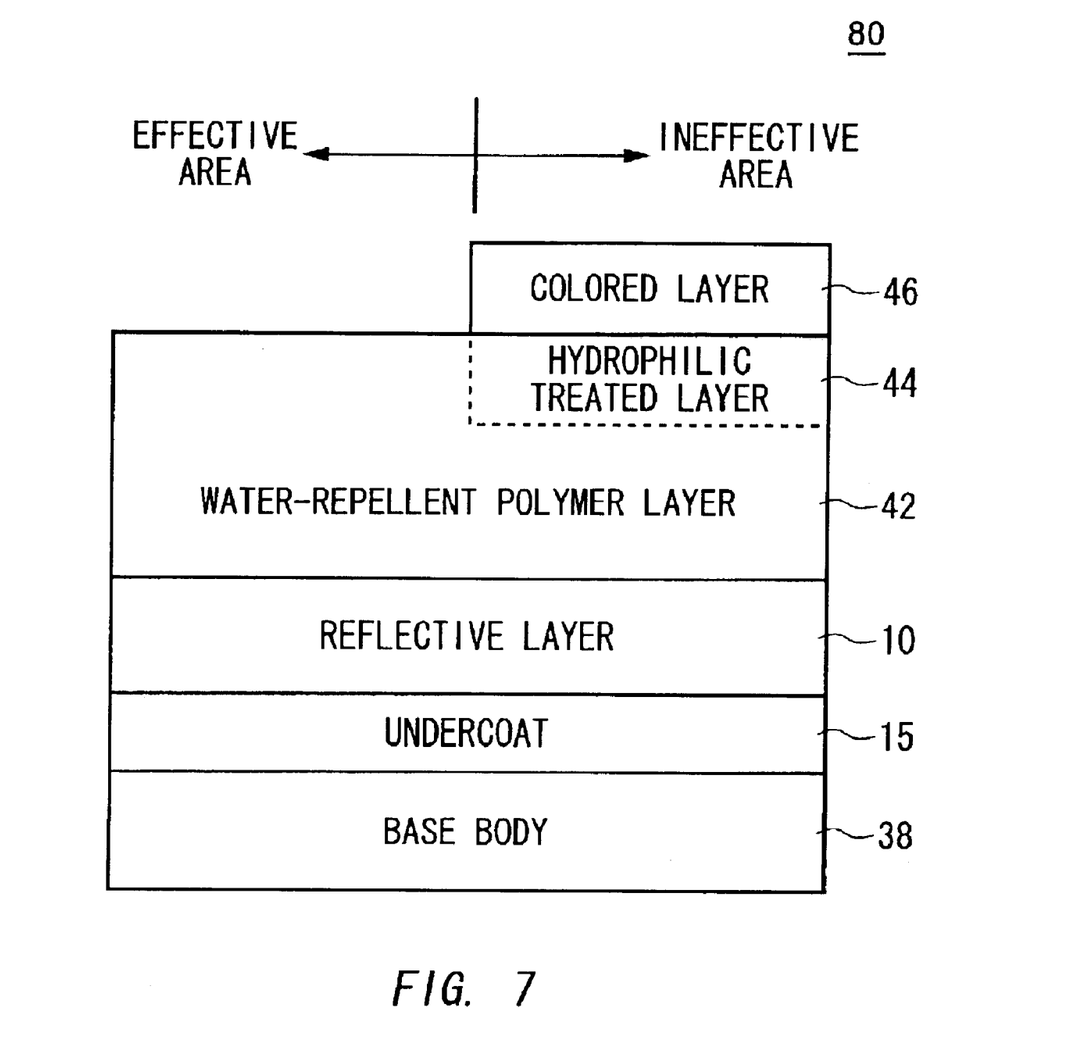
FIG. 7 is a schematic cross-sectional view of the reflector manufactured by the method for manufacturing the reflector according to the present invention.

FIG. 7 is a schematic cross-sectional view of the reflector manufactured by the reflector manufacturing method according to the present embodiment explained in FIGS. 3–6. The reflector includes the base body 38, the undercoat 15, the reflective layer 10, and the water-repellent polymer layer 42 in the effective area. In the ineffective area, the reflector further includes the layer 44, where the hydrophilic treatment is subjected to the surface of the polymer layer 42, and the colored layer 46 in addition to the components of the effective area. The hydrophilic treated layer 44 is formed by performing hydrophilic treatment, which is explained in FIGS. 6A and 6B, on the ineffective area of the surface of the polymer layer 42. The colored layer 46 is formed on the surface of the hydrophilic treated layer 44. For example, the colored layer 46 may be formed on the surface of the hydrophilic treated layer 44 by painting. Since the hydrophilic treated layer 44 is hydrophilic, hydrofuge or crawling does not occur between the hydrophilic treated layer 44 and the colored layer 46. Therefore, the high quality colored layer 46 is formed on the surface of the polymer layer 42. Moreover, since it is not necessary to form an additional layer, such as layer of silicon dioxide, on the surface of the polymer layer 42 as explained in FIG. 2, the reflector is manufactured economically.

Figure 8:
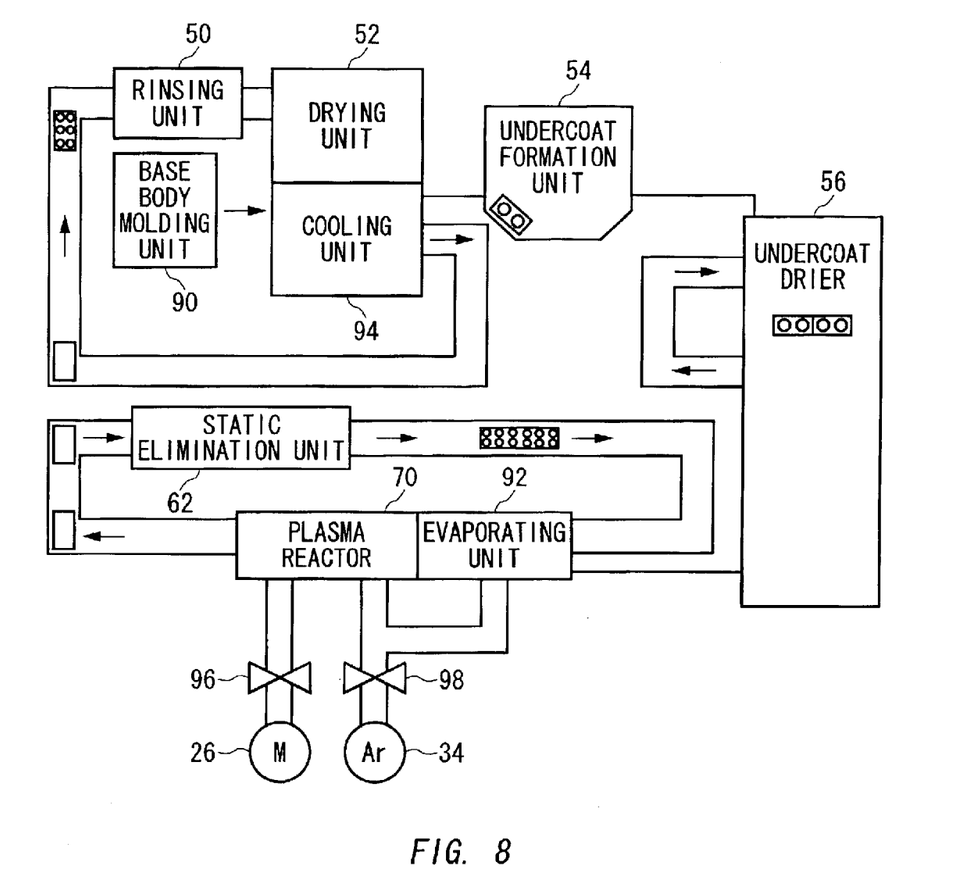
FIG. 8 is a schematic view of a configuration of an apparatus for manufacturing a reflector according to an embodiment of the present invention.

FIG. 8 is a schematic view of a configuration of an apparatus for manufacturing a reflector according to an embodiment of the present invention for realizing the method for manufacturing the reflector shown in FIGS. 3–6. The apparatus for manufacturing the reflector includes a base body molding unit 90, a cooling unit 94, a rinsing unit 50, a drying unit 52, an undercoat formation unit 54, an undercoat dryer 56, an evaporating unit 92, the plasma reactor 70, a first source 34, a second source 26, and a static elimination unit 62.

The base body molding unit 90 molds the base body 38 by molding raw material, such as synthetic resin or metallic material, into the shape of the reflector by injection molding or the like. The cooling unit 94 cools the molded base body 38. The rinsing unit 50 rinses the cooled base body 38. The drying unit 52 dries the rinsed base body 38. The undercoat formation unit 54 forms undercoat 15 on the surface of the dried base body 38. The undercoat drying unit 56 dries the formed undercoat 15. The evaporating unit 92 evaporates the reflective layer 10 on the surface of the undercoat 15 by using the gaseous argon supplied from the first source 34.

The plasma reactor 70 forms the water-repellent polymer layer 42 on the surface of the reflective layer 10. Furthermore, the plasma reactor 70 performs the hydrophilic treatment on the surface of the polymer layer 42 in the ineffective area using the principle explained in FIGS. 6A and 6B. Since the present embodiment is enable to perform both a process for forming the polymer layer 42 and a process for performing the hydrophilic treatment on the polymer layer 42 using the single plasma reactor 70, configuration of the apparatus for manufacturing the reflector is simplified. Therefore, since the apparatus for manufacturing the reflector may lack the apparatus for forming an additional hydrophilic layer on the surface of polymer layer 42, the reflector is manufactured economically.

The plasma reactor 70 connects with the first source 34 for supplying gaseous argon, and the second source 26 for supplying gaseous monomer. Moreover, the first source 34 branches and connects with the evaporating unit 92. That is, the first source 34 supplies gaseous argon to the plasma reactor 70 for performing the hydrophilic treatment of the polymer layer 42, and to the evaporating unit 92 for evaporating the reflective layer 10. Therefore, the configuration of the apparatus for manufacturing the reflector is simplified. Furthermore, since the present embodiment performs the hydrophilic treatment on the surface of the polymer layer 42 using gaseous argon, the surface of the polymer layer 42 is subjected to the hydrophilic treatment layer more safely than the treatment using oxygen.

The process for forming the polymer layer 42 and the process for performing the hydrophilic treatment on the polymer layer 42 are performed using the single plasma reactor 70 as stated below. First, a valve 96 of the second source 26 is opened, and the gaseous monomer is supplied to the plasma reactor 70 from the second source 26. The plasma reactor 70 generates monomer plasma and forms the polymer layer 42 on the surface of the reflective layer 10 by polymerizing the monomer on the reflective layer 10. During the formation of the polymer layer 42, the valve 98 of the first source 34 is closed. After the formation of the polymer layer 42 is completed, the valve 96 of the second source 26 is closed, and the atmosphere of the gaseous monomer is removed from inside of a chamber 22 of the plasma reactor 70. Next, the valve 98 of the first source 34 is opened and gaseous argon is supplied to the plasma reactor 70. The plasma reactor 70 generates plasma of the gaseous argon using a plasma generator 24, and performs the hydrophilic treatment on the surface of the polymer layer 42.

Therefore, the polymer layer formation and the hydrophilic treatment on the polymer layer 42 are sequentially carried out by switching the gas supplied to the plasma reactor 70 to the gaseous argon supplied from the first source 34 from the gaseous monomer supplied from the second source 26, or by changing the gas from the gaseous argon to the gaseous monomer. Furthermore, since processing conditions, such as degree of vacuum in the chamber 22 of the plasma reactor 70 and power of the plasma generator 24, at the polymer layer formation are the same as the processing conditions at the hydrophilic treatment on the polymer layer 42, it is unnecessary to change the processing conditions between the processes of the polymer layer formation and the hydrophilic treatment. Therefore, the reflector is manufactured in a short time.

Figure 9A:
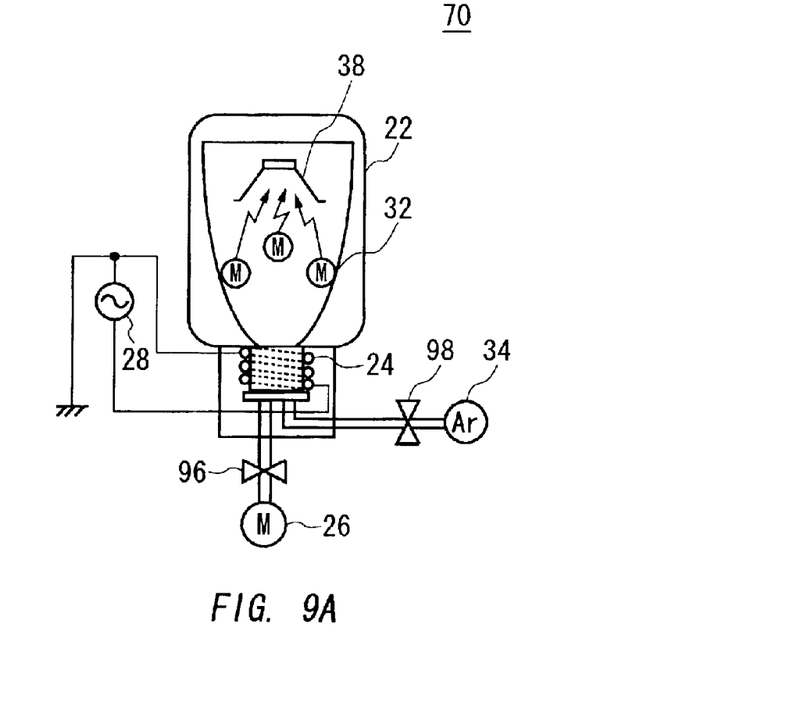
FIGS. 9A and 9B are detailed views of a configuration of a plasma reactor shown in FIG. 8.
Figure 9B:
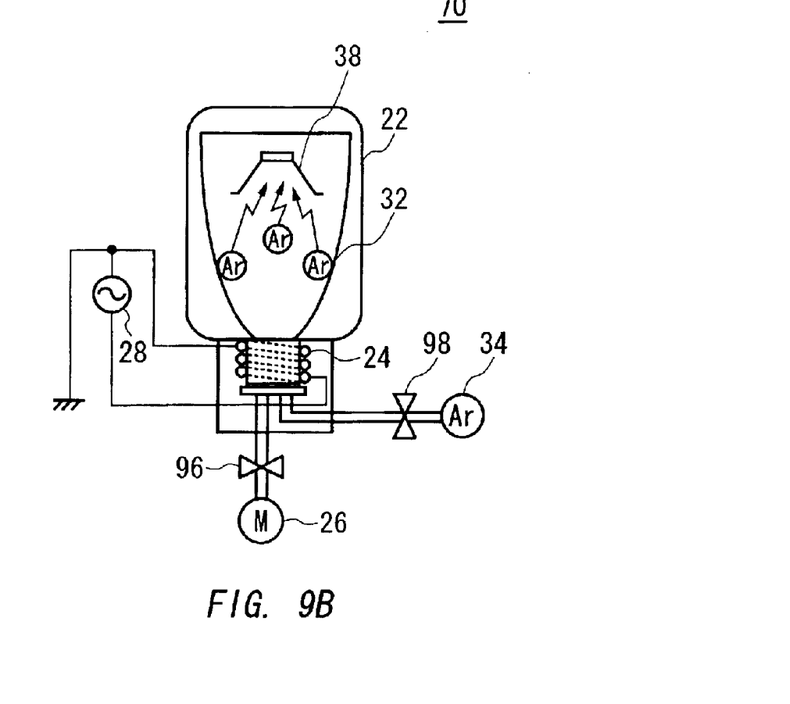

FIGS. 9A and 9B are detailed views of the configuration of the plasma reactor 70 shown in FIG. 8. FIG. 9A shows the plasma reactor 70 in the plasma polymer layer formation step (S30), and FIG. 9B shows the plasma reactor 70 in the hydrophilic treatment step (S32).

The plasma reactor 70 includes an RF generator 28, the plasma generator 24, and the chamber 22. The RF generator 28 generates high-frequency current. The plasma generator 24 connects with the first source 34 and the second source 26.

Furthermore, the plasma generator 24 connects with the RF generator 28. The plasma generator 24 generates the monomer plasma 32 from gaseous monomer supplied from the second source 26, or generates argon plasma 36 from gaseous argon supplied from the first source 34, using the high-frequency current supplied from the RF generator 28.

The chamber 22 connects with the plasma generator 24 and accommodates the base body 38.

When the plasma reactor 70 forms the polymer layer 42, the monomer plasma is generated by the plasma generator 24 and the water-repellent polymer layer 42 is formed on the surface of the reflective layer 10 on the base body 38 accommodated in the chamber 22. On the other hand, when the plasma reactor 70 performs the hydrophilic treatment, the argon plasma is generated by the plasma generator 24, and the surface of the polymer layer 42 is subjected to the hydrophilic treatment layer by the argon plasma contacting the surface of the polymer layer 42 on the base body 38 accommodated in the chamber 22.

Figure 10:
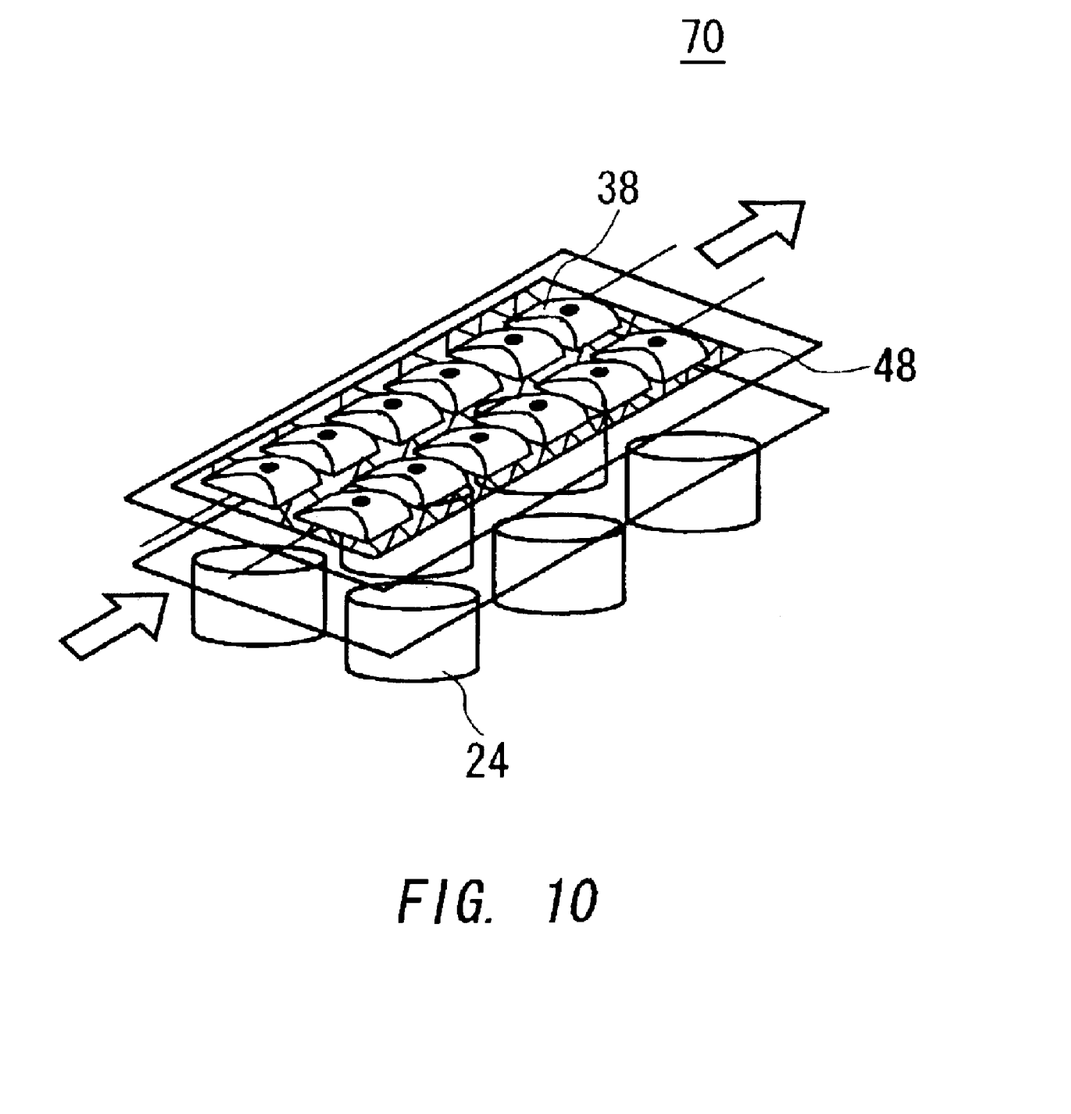
FIG. 10 is a detailed view of inside of a chamber of the plasma reactor.

FIG. 10 is a detailed view of inside of the chamber 22 of the plasma reactor 70. The plasma reactor 70 includes a plurality of plasma generators 24. The plasma reactor 70 shown in FIG. 10 includes six plasma generators 24, although the number of the plasma generators 24 is not limited to six pieces. A plurality of base bodies 38 installed on a cart 48 are inserted into the plasma reactor 70 from the direction of an arrow depicted in FIG. 10, and are configured above the plasma generators 24.

When forming the polymer layer 42, the plasma generators 24 spray monomer gas towards the base bodies 38, of which the openings are faced downward on the cart 48, and form the plasma polymer layer 42 on the surface of the base bodies 38. When performing hydrophilic treatment on the polymer layer 42, the plasma generators 24 spray gaseous argon towards the base bodies 38 and perform hydrophilic treatment on the surface of the polymer layer 42.

After the polymer layer 42 is formed on the surface of the base bodies 38 installed on the cart 48 and the surface of the polymer layer is subjected to the hydrophilic treatment layer, the cart 48 is withdrawn to exterior of the plasma reactor 70, toward the direction of the arrow depicted in FIG. 10.

As explained above, according to the method and the apparatus for manufacturing the reflector of the present embodiment, the reflector is manufactured economically and in a short time.

EXAMPLE 1

The present invention will be understood more readily with reference to the following example; however this example is intended to illustrate the invention and is not to be constructed to limit the scope of the present invention.

TABLE 1

| hydrophilic treatment | thickness of polymer layer [Å] | hydrophilic treatment conditions | | | alkali resistance [1% KOH. 10 min] | contact angle [deg] | overall quality |
|---|---|---|---|---|---|---|---|
| | | press. [Pa] | RF output [W] | duration [sec] | | | |
| example 1 (polymer layer + argon plasma) | 550 | 1.3 | 2000 | 10 | ○ | 18 | good |
| comparative example 1 (polymer layer + oxygen plasma) | 550 | 0.5 | 500 | 1 | X | ≤32 | poor |
| comparative example 2 (polymer layer + gaseous oxygen) | 550 | 20 | N/A | 5 | X | >90 | poor |

Table 1 is a result of an examination which measures quality of the reflector manufactured by various kinds of hydrophilic treatment methods. In an example 1 in the Table 1, the surface of the polymer layer 42 was treated to be hydrophilic by the method using argon plasma explained in the present embodiment. In the example 1, a thickness of the polymer layer, which was treated to be hydrophilic, was set as 550 angstrom. Furthermore in the example 1, pressure was set as 1.3 Pascal, high-frequency output was set as 2000 W, and duration of hydrophilic treatment was set as 10 seconds, as hydrophilic treatment conditions.

In a comparative example 1 in Table 1, the surface was subjected to the hydrophilic treatment by method using oxygen plasma. In the comparative example 1, a thickness of the polymer layer, which was treated to be hydrophilic, was set as 550 angstrom, as well as in the example 1. Furthermore in the comparative example 1, pressure was set as 0.5 Pascal, high-frequency output was set as 500 W, and duration of hydrophilic treatment was set as 1 second, as hydrophilic treatment conditions. In a comparative example 2 in Table 1, the surface was subjected to the hydrophilic treatment using gaseous oxygen. In the comparative example 2, a thickness of the polymer layer, which was treated to be hydrophilic, was set as 550 angstrom, as well as in the example 1. Furthermore in the comparative example 2, pressure was set as 20 Pascal, and duration of hydrophilic treatment was set as 5 seconds, as hydrophilic treatment conditions. High-frequency output was not set since plasma was not used in the comparative example 2.

A result of the hydrophilic treatment on the polymer layer 42 on each hydrophilic treatment conditions is shown in Table 1. In the example 1 using argon plasma, alkali resistance was higher than the comparative example 1 using oxygen plasma and the comparative example 2 using gaseous oxygen. In other words, hydrophobicity in the example 1 was higher than that of the comparative examples 1 and 2.

Moreover, while a contact angle between the hydrophilic treated layer 44 and a water drop needed to be about 50 degrees or less, a contact angle in the example 1 was small enough to fulfill the criterion compared with a contact angle in the comparative examples 1 and 2. In the comparative example 2 using gaseous oxygen, the contact angle between the hydrophilic treated layer 44 and a water drop became greater than 90 degrees, which did not fulfill the criterion of about 50 degrees or less.

When the surface of the polymer layer 42 is subjected to the hydrophilic treatment layer using oxygen plasma or oxygen gas, since the oxygen excessively accelerates rate of the substitution of hydrophilic group for hydrophobic group, it is difficult to control degree of the hydrophilic treatment on the polymer layer 42. Therefore, the degree of the hydrophilic treatment on the polymer layer 42 overreaches, and consequently the hydrophobicity of the polymer layer 42 decreases, the function as an overcoat is deteriorated, and the alkali resistance decreases.

On the other hand, when the surface of the polymer layer is subjected to the hydrophilic treatment layer using gaseous argon, since the rate of the substitution of hydrophilic group for hydrophobic group is lower than the substitution rate using oxygen, quantity of the hydrophilic group which is substituted for the hydrophobic group is easily controlled based on the duration of the hydrophilic treatment. Therefore, the method of the present embodiment using gaseous argon controls the degree of the hydrophilic treatment on the polymer layer 42 so as to maintain high alkali resistance and to make the contact angle between the polymer layer 42 and a water drop to be about 50 degrees or less.

Comprehensively, the quality of the polymer layer 42, which is manufactured by the manufacturing method and apparatus of the present embodiment, is higher than polymer layer manufactured by the other methods. Moreover, manufacturing costs of the reflector using the method and apparatus of the present embodiment are lower than manufacturing costs of the reflector using a conventional method and apparatus. Furthermore, since gaseous oxygen used in the comparative examples 1 and 2 is more dangerous than gaseous argon, the method in the present embodiment using gaseous argon is safer than the other methods.

As described above, according to the present invention, the hydrophilic layer can be formed on the surface of the ineffective area of the reflector economically and safely.

Although the present invention has been described by way of an exemplary embodiment, it should be understood that those skilled in the art might make many changes and modifications without departing from the spirit and the scope of the present invention which is defined only by the appended claims.

What is claimed is:

1. A method for manufacturing a reflector, comprising steps of:
   molding a base body of the reflector;
   forming reflective layer for reflecting light on a surface of the base body;
   forming layer of water-repellent polymer on a surface of the reflective layer; and
   performing hydrophilic treatment on a surface of the polymer layer using plasma of gaseous argon.

2. The method for manufacturing a reflector as claimed in claim 1, wherein said reflective layer formation step comprises a step of evaporating the reflective layer on a surface of the base body using the gaseous argon supplied from the same source as that of the gaseous argon used in said hydrophilic treatment step.

3. The method for manufacturing a reflector as claimed in claim 1, wherein said polymer layer formation step forms the polymer layer by polymerizing hexamethyldisiloxane.

4. The method for manufacturing a reflector as claimed in claim 1, further comprising a step of forming a colored layer on a surface of the polymer layer, on which the surface is subjected to the hydrophilic treatment.

5. The method for manufacturing a reflector as claimed in claim 1, wherein said hydrophilic treatment step substitutes hydrophilic group for hydrophobic group on a surface of the polymer layer by plasma of the gaseous argon contacting a surface of the polymer layer.

* * * * *